United States Patent [19]
Senkeleski et al.

[11] Patent Number: 5,846,786
[45] Date of Patent: Dec. 8, 1998

[54] THERMALLY-INHIBITED, SUBSEQUENTLY ENZYMATICALLY-TREATED STARCHES

[75] Inventors: Jamie L. Senkeleski, Neshanic Station, N.J.; Zu-Feng Xu, Newark, Del.

[73] Assignee: National Starch and Chemical Investment Holding Corporation, Wilmington, Del.

[21] Appl. No.: 917,672

[22] Filed: Aug. 21, 1997

[51] Int. Cl.⁶ .......................... C12P 19/20; C08B 30/00; C08B 30/12
[52] U.S. Cl. ................ 435/96; 127/21; 127/29; 127/32; 127/65; 127/67; 435/95; 536/111
[58] Field of Search ............... 127/65, 29, 32, 127/67, 21; 536/111; 435/95, 96

[56] References Cited

U.S. PATENT DOCUMENTS

| | | | |
|---|---|---|---|
| 3,644,126 | 2/1972 | Bodnar et al. | 99/142 |
| 3,922,196 | 11/1975 | Leach et al. | 195/31 R |
| 4,452,978 | 6/1984 | Eastman | 536/111 |
| 5,445,950 | 8/1995 | Kobayashi et al. | 435/99 |
| 5,641,349 | 6/1997 | Koubek et al. | 106/206.1 |
| 5,688,845 | 11/1997 | Eden et al. | 524/48 |
| 5,718,770 | 2/1998 | Shah et al. | 127/65 |
| 5,795,397 | 8/1998 | Shi et al. | 127/29 |

FOREIGN PATENT DOCUMENTS

| | | | |
|---|---|---|---|
| 0 182 296 A2 | 5/1986 | European Pat. Off. | A61K 7/035 |
| 0 704 169 A2 | 4/1996 | European Pat. Off. | A23L 1/0522 |
| WO 96/03892 | 2/1996 | WIPO | A23L 1/0522 |
| WO 96/04315 | 2/1996 | WIPO | C08B 31/12 |

OTHER PUBLICATIONS

"Glucose Syrups", Food Review–Dec. 1992/Jan. 1993, p. 33.

*Primary Examiner*—Herbert J. Lilling
*Attorney, Agent, or Firm*—Karen G. Kaiser

[57] ABSTRACT

The present invention is directed to a thermally inhibited, subsequently enzymatically hydrolyzed, ungelatinized, granular starch or flour and the process of making such starch or flour. Such starch or flour is useful as an ingredient in food products, particularly fruit- or vegetable-based products.

17 Claims, No Drawings

THERMALLY-INHIBITED, SUBSEQUENTLY ENZYMATICALLY-TREATED STARCHES

BACKGROUND OF THE INVENTION

The present invention relates to thermally-inhibited, enzymatically-treated starches and to a process for their preparation. Such starch products are useful in the preparation of food products, particularly fruit and vegetable based products.

Numerous starch products prepared using a variety of processes are known in the art. These include starches which are prepared by thermal inhibition or enzymatic treatment.

Thermally inhibited starches have been disclosed in the art. For example, European Patent Application Publication No. 0 721 471 discloses thermally inhibited starches and flours and No. 0 735 827 discloses their use in food products. Enzymatic treatment of starches has also been disclosed in the art. U.S. Pat. No. 3,644,126 discloses a method of liquefying a starch slurry using α-amylase and then malt enzymes and glucoamylase to make a highly fermentable starch conversion syrup with a DE less than 35. U.S. Pat. No. 3,922,196 discloses solubilization of a granular starch to essentially dextrose using α-amylase. U.S. Pat. No. 5,445,950 discloses a method of using α-amylase to prepare slightly decomposed starch granules with a DE preferably between 0.1 and 1.0 to produce a material useful as a raw material in the sugar industry.

EP 182 296 discloses a granular α-amylase hydrolyzed starch for use as a dusting powder. EP 231 729 discloses a gelatinized starch hydrolysate useful as a sweetener in foods which is prepared using α- and β-amylase in a two-step process. EP 704 169 discloses partially gelatinized starch which is hydrolyzed to a DE of preferably between 4 and 10 for use as a fat or oil substitute.

The use of glucose syrups in a variety of foods, including ketchup, jams, marmalades and fruit preparations, has been reported in Food Review, 19(6):33 (1993). Glucose syrups are purified, concentrated aqueous solutions of nutritive saccharides of DE 20 or more obtained by hydrolysis of edible starch. See Whistler et al., *Starch Chemistry and Technology*, $2^{nd}$ Ed., Academic Press, Inc. Orlando, pp. 612 (1984). Further, glucose syrups known in the art do not add viscosity to food products. They are primarily added to provide or balance sweetness, as a bulking agent or filler, and to enhance Maillard browning.

Surprisingly, it has now been discovered that thermal inhibition followed by enzyme hydrolysis produces unique starches useful in food products, particularly vegetable- or fruit-based products.

SUMMARY OF THE INVENTION

The present invention is directed to a thermally inhibited, subsequently enzymatically hydrolyzed, ungelatinized, granular starch or flour and the process of making such starch or flour. Such starch or flour is useful as an ingredient in food products, particularly fruit- or vegetable-based products.

An object of the present invention is to provide a thermally inhibited, subsequently enzymatically hydrolyzed, ungelatinized, granular starch or flour.

Another object of the present invention is to provide a method of preparing a thermally inhibited, subsequently enzymatically hydrolyzed, ungelatinized, granular starch or flour.

Still another object of the present invention is to provide a food product containing a thermally inhibited, subsequently enzymatically hydrolyzed, ungelatinized, granular starch or flour, particularly a fruit- or vegetable-based food product.

A further object of the present invention is to provide a tomato-based product in which a portion of the tomato solids have been replaced by a thermally inhibited, subsequently enzymatically hydrolyzed, ungelatinized, granular starch or flour.

A still further object of the present invention is to provide a fruit-based product in which at least a portion of the pectin has been replaced by a thermally inhibited, subsequently enzymatically hydrolyzed, ungelatinized, granular starch or flour.

These and other objects of the present invention will become apparent to one skilled in the art from the following detailed description and examples below.

DETAILED DESCRIPTION OF THE INVENTION

The present invention is directed to a thermally inhibited, subsequently enzymatically hydrolyzed, ungelatinized, granular starch or flour and the process of making such starch or flour. Such starch or flour is useful as an ingredient in food products, particularly fruit- or vegetable-based products.

All starches and flours are suitable for use herein and may be derived from any native source. A native starch or flour, as used herein, is one as it is found in nature. Typical sources for the starches and flours are cereals, tubers, roots, legumes and fruits. The native source can be corn, pea, potato, sweet potato, banana, barley, wheat, rice sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 45% by weight amylose. In particular, maize, waxy maize, potato, waxy potato, tapioca, waxy tapioca, and waxy barley, more particularly waxy maize, are useful in the instant invention.

Thermal inhibition is known in the art and has been disclosed, for example, in European Patent Application Publication No. 0 721 471. Native granular starches have a natural pH of about 5.0 to 6.5. When such starches are heated to temperatures above about 125° C. in the presence of water, acid hydrolysis (degradation) of the starch occurs which may impede or prevent inhibition. Therefore, the dehydration conditions need to be chosen so that degradation is avoided. Suitable conditions are dehydrating at low temperatures and the starch's natural pH or dehydrating at higher temperatures after increasing the pH of the starch to neutral or above. As used herein, the term "neutral" covers the range of pH values around pH 7 and is meant to include from about 6.5 to 7.5. At a pH above about 12, gelatinization occurs more easily so a pH of below about 12 is generally more effective in the instant invention. In particular, a pH of about 8.5 to 10.5 is effective in the instant invention. The textural and viscosity benefits of the thermal inhibition process tend to be enhanced as the pH is increased although the browning also tends to increase.

The pH may be adjusted by any method known in the art. For example, the ungelatinized granular starch or flour may be slurried in water or another (buffered) aqueous medium, in a ratio of 1.5 to 2.0 parts by weight of water to 1.0 part of starch or flour, and the pH may be raised by the addition of any suitable base. Buffers, such as sodium phosphate, may be used to maintain the pH if needed. Alternatively, a solution of a base may be sprayed onto the powdered starch or flour until the starch or flour attains the desired pH, or an alkaline gas such as ammonia can be infused into the starch or flour. After the pH adjustment, the slurry is then either dewatered and dried, or dried directly, typically to a moisture content of from about 2 to about 15% by weight. These drying procedures are to be distinguished from the thermal inhibition process steps in which the starch or flour is dehydrated to anhydrous or substantially anhydrous and then heat treated.

Suitable bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and any other bases approved for use under the applicable regulatory laws. A particularly suitable base is sodium carbonate. It may be possible to use bases not approved provided they can be washed from the starch or flour so that the final product conforms to good manufacturing practices for the desired end use.

A thermal dehydration is carried out by heating the starch or flour in a heating device for a time and at a temperature sufficient to reduce the moisture content to less than about 1% by weight, particularly essentially 0%. In general, the temperatures used are less than about 125° C., particularly about 100° to 120° C. The dehydrating temperature can be lower than 100° C., but a temperature of at least about 100° C. will be more efficient for removing moisture.

Representative processes for carrying out a non-thermal dehydration include freeze drying or extracting the water from the starch or flour using a solvent, particularly a hydrophilic solvent, more particularly a hydrophilic solvent which forms an azeotropic mixture with water (e.g., ethanol).

The solvent dehydration step may be carried out in any suitable extraction apparatus known in the art, particularly any continuous extraction apparatus.

For dehydration by freeze drying, the starch or flour (at a moisture of about 4 to 5%) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture. The temperature is held constant at about 20° C. and a vacuum is drawn to about 50 milliTorr (mT). The starch or flour is removed from the freeze dryer and immediately placed into a suitable heating apparatus for the heat treatment.

After it is dehydrated, the starch or flour is heat treated for a time and at a temperature sufficient to inhibit the starch or flour. In general, heating temperatures greater than about 100° C. are used. For practical purposes, the upper limit of the heat treating temperature is about 200° C. Typical temperatures are from about 120° to 180° C., particularly from about 140° to 160° C., more particularly about 160° C. The temperature selected will depend upon the amount of inhibition desired and the rate at which it is to be achieved.

The time at the final heating temperature will depend upon the level of inhibition desired. When a conventional oven is used, the time ranges from about 1 to 20 hours, typically about 2 to 5 hours, usually about 3.5 to 4.5 hours. When a fluidized bed is used, the times range from about 0 minutes to 20 hours, typically about 0.5 to 3.0 hours. Longer times are required at lower temperatures to obtain more inhibited starches.

For most applications, the thermal dehydrating and heat treating steps will be continuous and accomplished by the application of heat to the starch or flour beginning from ambient temperature. The moisture will be driven off during the heating and the starch will become anhydrous or substantially anhydrous. Usually, at these initial levels of inhibition, the peak viscosities are higher than the peak viscosities of starches heated for longer times, although there will be greater breakdown in viscosity from the peak viscosity. With continued heat treating the peak viscosities are lower, but the viscosity breakdowns are less.

The process may be carried out as part of a continuous process involving the extraction of the starch from a plant material.

The source of the starch or flour, the initial pH, the dehydrating conditions, the heating time and temperature, and the equipment used are all interrelated variables that affect the amount of inhibition.

The heating steps may be performed at normal pressures, under vacuum or under pressure, and may be accomplished by conventional means known in the art particularly by the application of dry heat in dry air or in an inert gaseous environment.

The heat treating step can be carried out in the same apparatus in which the thermal dehydration occurs. Most conveniently the process is continuous with the thermal dehydration and heat treating occurring in the same apparatus, as when a fluidized bed is used.

The dehydrating and heat treating apparatus can be any industrial oven, conventional oven, microwave oven, dextrinizer, dryer, mixer or blender equipped with heating devices and other types of heaters, provided that the apparatus is fitted with a vent to the atmosphere so that moisture does not accumulate and precipitate onto the starch or flour. In particular, the apparatus is a fluidized bed, particularly one in which the apparatus is equipped with a means for removing water vapor, such as a vacuum or a blower to sweep air or the fluidizing gas from the head-space of the fluidized bed. Suitable fluidizing gases include air and nitrogen, particularly dry air. For safety reasons, a gas containing less than 12% oxygen is particularly suitable.

Superior inhibited starches having high viscosities with low percentage breakdown in viscosity are obtained in shorter times in the fluidized bed than can be achieved using other conventional heating ovens or dryers.

Optional steps can be carried out to improve the color and/or flavor. They include washing the starch or flour with water and/or removing protein and/or lipid from the starch or flour prior to the dehydrating step and/or after the heat treating step. A bleaching agent (e.g., sodium chlorite) or an alkali can be used for the protein and/or lipid removal.

The starches or flours may be inhibited individually or more than one may be inhibited at the same time. They may be inhibited in the presence of other materials or ingredients that would not interfere with the thermal inhibition process or alter the properties of the starch or flour product.

The resultant thermally inhibited granular starch is then enzymatically hydrolyzed by at least one amylase capable of digesting granular starch at significant rates, particularly α-amylase, glucoamylase, or maltogenase, using techniques known in the art. The enzyme must be capable of cleaving the alpha-D-glucosidic linkages of the starch in a granular state. The amount of enzyme is dependent upon the enzyme, i.e., type, source and activity, and base starch material used as well as the amount of hydrolysis desired. Typically, the enzyme is used in an amount of from about 0.1 to about 1.0% by weight of the starch. For example, 0.2 to 0.6% glucoamylase (AMG-300L commercially available from Novo Nordisk) has been found to be effective in the instant invention.

Generally the enzyme treatment is carried out at a solids level of about 10 to about 40%, depending upon the base starch being treated. A solids level of from about 15 to 35% is particularly useful, from about 18 to 23% more particularly useful, in the instant invention.

The pH and temperature of the slurry should be adjusted to provide effective enzyme hydrolysis. These parameters are dependent upon the enzyme to be used and are known in the art. In general, a temperature of about 22° to about 65° C. is used, particularly from about 50° to about 62° C. The temperature should be kept below the gelatinization temperature, particularly about 5° C. below the gelatinization temperature of the base starch material so as to maintain the starch in the granular state. In general, the pH is adjusted to about 3.5 to about 7.5, particularly from about 4.0 to about 6.0, using techniques known in the art.

The enzyme reaction is continued until a dextrose equivalent of at least about 5 and up to about 60, particularly about 15 to about 35, more particularly about 20 to about 30, has been achieved, or until the desired end point (i.e., sufficient degradation to provide the desired functionality for the particular application) has been reached. The end point may be determined by a change in viscosity, by reducing sugar content, or by any other method known in the art for measuring the level of enzyme degradation of the starch molecule. In general, the enzyme reaction will take from about 0.1 to about 24 hours, particularly about 0.5 to about 4 hours. The time of the reaction is dependent upon the type of starch and enzyme used, the amount of enzyme used, and the reaction parameters of solids percent, pH, and temperature.

Dextrose equivalent (DE) is defined as the reducing power of the hydrolysate. Each starch molecule has one reducing end; therefore DE is inversely related to molecular weight. The DE of anhydrous D-glucose is defined as 100 and the DE of unhydrolyzed starch is virtually zero.

The enzyme degradation is then terminated by acid deactivation as known in the art, particularly by adjusting the pH to greater than about 9.0 at a temperature greater than about 55° C. for at least 30 minutes. In the alternative, the enzyme degradation may be terminated by heat deactivation as known in the art, particularly by raising the temperature to about 85° to about 95° C. and maintaining it at that temperature for at least about 10 minutes to fully deactivate the enzyme. Heat deactivation is not suitable if a granular product is desired as the heat necessary to deactivate the enzyme will generally also gelatinize the starch.

The resultant slurry is typically adjusted to the desired pH according to its intended end use. In general, the pH is adjusted to from about 5.0 to about 7.5, particularly from about 6.0 to about 7.0, using techniques known in the art.

The resultant starch (hydrolysate) may be used directly in liquid form. Alternatively, the resultant starch may be recovered in powdered form by conventional techniques known in the art, including drum drying, freeze drying, and spray drying with or without gelatinization. Gelatinization may be desirable in some applications, for example, in instant products and/or products in which the starch is not cooked out.

The resulting starch is characterized by a relatively high viscosity, moderate cohesiveness or gel strength, heat and shear tolerance, short texture, excellent water holding ability, neutral taste, and by its unique functionality in food products, particularly fruit or vegetable based food products. Further, the resulting starch may provide many of the attributes of a cross-linked starch.

The resultant starches may be used at any level desired in food products, the amount being dependent upon its desired viscosity. In general, the starch will be used in an amount of from about 0.01 to about 10%, particularly from about 0.1 to about 5% by weight of the food product.

The resultant starch can be used in various food products including, but not limited to, dressings, including sauces, including tomato-based sauces, white sauces, and dairy-based sauces such as cheese sauces; condiments such as ketchup, salsa, and barbecue sauce; fruit preps; jellies, jams, and marmalades; pie fillings, including fruit and cream fillings; pourable dressings and spoonable dressings, including mayonnaise; gravies; lite syrups; puddings; custards; yogurts; beverages, including dairy-based beverages; glazes; soups; shortenings, including margarines; processed meats; tofu; and baby foods.

The resultant starches are particularly useful in vegetable-based food products, particularly when a starch is desired which has a relatively high process tolerance against heat, acid, and/or shear, has a high viscosity, is stable against gelling, has a clean flavor, and/or prevents serum separation. For example, the resultant starches are particularly useful in tomato-based products such as ketchup, barbecue sauce, tomato sauce, and salsa to reduce the amount of tomato solids without loss of viscosity or texture and to add a pulpiness that is often desired. Further, in ketchup and in barbecue and tomato sauce, use of the resultant starches reduces serum separation during storage, thus improving the overall quality of the product.

The starches may be used to prepare tomato paste using either hot or cold break processes. "Hot break," as used herein, is intended to describe the process of preparing tomato paste from fresh tomatoes by using heat and mechanical shear to crush and homogenize the tomatoes. "Cold break," as used herein, is intended to describe the process of preparing tomato paste from fresh tomatoes by using only mechanical force to crush fresh tomatoes at mild temperatures. Cold break tomato paste requires a higher level of tomato solids to provide similar viscosity to hot break tomato paste. However, the cold break process provides better tomato flavor and color. The present starches may be used to replace at least a portion of the tomato solids in either type of tomato paste, compensating for the loss in viscosity and controlling serum separation without the undesirable cohesiveness, gelling, or starchy taste generally provided by other starches.

The resultant starches are also particularly useful in fruit-based food products, particularly when a starch is desired which is relatively easy to cook out at high solids, provides a short texture, controls moisture migration, has a clean flavor, and/or provides a relatively low hot viscosity during processing. For example, the resultant starches may be used in fruit preps, jams, jellies, and fruit fillings to reduce the amount of pectin or even replace it in total without a loss in viscosity. In particular, the starches are useful in fruit-based products which have a high solids content, such as fruit preps, but are also useful in a low solid systems such as low/no sugar fruit preps. When fruit preps using the resultant starches are used in yogurts, the interface that occurs between the fruit and the white mass is significantly reduced, the stir-down and mouthfeel are improved to create a smoother yogurt, the color bleed from the fruit into the white mass is reduced, and the water capacity is improved resulting in reduced syneresis upon storage.

EXAMPLES

The following examples are presented to further illustrate and explain the present invention and should not be taken as limiting in any regard.

Measurement of the Net Sugar Concentration

The net sugar concentration in the examples, when measured using a refractometer, was determined using the following procedure.

1.5 ml of the slurry was withdrawn using a Pasteur pipette and placed into a 1.8 ml Eppendorf tube. The tube was placed into a micro centrifuge and run at a speed of 8,000–10,000 rpm for 30–60 seconds. One drop of the clear supernatant was removed and placed on a calibrated refractometer (calibrated to zero using water). The concentration of the soluble supernatant was read.

Example 1

Starch Preparation a. thermal inhibition—A 30% solids by weight waxy corn starch slurry was prepared and its pH was adjusted to 9.6 using sodium carbonate. The pH adjusted starch was filtered using a basket decanter (commercially available from Reinveld) and dried using a flash drier to a moisture of 13%. The starch was then further dried in a fluidized bed reactor to less than 1% moisture at a temperature of 130° C. The starch was then heated to 160° C. and held at this temperature for 145 minutes to produce a product with a Brabender viscosity of 450. The starch was then cooled to 65° C. within the reactor by supplying cooling water to the jacket and introducing cold air. The starch was then reslurried to 25% solids by weight and washed. The balance of the slurry was adjusted to 14% and the pH was adjusted to 5.2 using hydrochloric acid. The slurry was washed using a disk centrifuge (commercially available from Merco), filtered using a basket decanter, and dried to 11% moisture using a flask drier.

Enzyme treatment—1.0 kg of the thermally inhibited starch at a moisture of 10.5% was slurried in 3 L of water and the pH was adjusted to 4.5 with dilute hydrochloric acid. 5 g of glucoamylase (AMG 300 L commercially available from Novo Nordisk) were added. The slurry was placed in a 55° C. water bath and allowed to react for five hours with constant stirring. The pH was adjusted to 9.5 using sodium hydroxide. The slurry was maintained at this pH and temperature for half an hour to deactivate the enzyme. The pH was then adjusted to 6.5 using dilute hydrochloric acid.

b. The slurry of Example 1a was spray dried using the following conditions:

| | |
|---|---|
| inlet temperature | 225° C. |
| outlet temperature | 100° C. |
| % solids | 20% |
| speed | 30–35 rpm |
| inlet tube diameter | ¼ inch |

Example 2

Variations on the Starch Preparation a. The thermal inhibition of Example 1a was repeated with the exception that the starch was held at 160° C. for 90 minutes instead of 145 minutes. 100 g of the thermally inhibited starch at a moisture content of 12.0% were slurried in 200 mL of water and the pH was adjusted to 4 with dilute hydrochloric acid. 3 g (0.30% w/w) of glucoamylase (AMG 300 L) were added. The slurry was placed in a 55° C. water bath and allowed to react with constant stirring until the net sugar concentration as measured using a refractometer reached 9.0%. The pH was adjusted to 9.5 using 4% sodium hydroxide. The slurry was maintained at this pH and temperature for half an hour to deactivate the enzyme. The pH was then adjusted to 6.5 using dilute hydrochloric acid and the slurry was spray dried using the procedure of Example 1b.

b. The thermal inhibition of Example 1a was repeated with the exception that the starch was held at 160° C. for 100 minutes instead of 145 minutes. 18.7 kg of the thermally inhibited starch at a moisture content of 12.4% were slurried in 40 L of water and the pH was adjusted to 4.0 with dilute hydrochloric acid. 46.8 g (0.25% w/w) of glucoamylase (AMG 300 L) were added. The slurry was placed in a 58° C. water bath and allowed to react with constant stirring. After 4 hours, an additional 0.05% enzyme was added and the reaction was continued until the net sugar concentration using a refractometer reached 8.5%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 18.6 and a moisture content of 3.8%.

c. The thermal inhibition of Example 1a was repeated with the exception that the starch was held at 160° C. for 160 minutes instead of 145 minutes. 20.0 kg of the thermally inhibited starch at a moisture content of 11.7% were slurried in 40 L of water and the pH was adjusted to 4.5 with dilute hydrochloric acid. 80 g (0.40% w/w) of glucoamylase (AMG 300 L) were added. The slurry was placed in a 57° C. water bath and allowed to react with constant stirring until the net sugar concentration as measured using a refractometer reached 9.2%. The pH was adjusted to 9.5 using 4% sodium hydroxide. The slurry was maintained at this pH and temperature for half an hour to deactivate the enzyme. The pH was then adjusted to 6.5 using dilute hydrochloric acid and the slurry was spray dried using the procedure of Example 1b. The resultant starch had a dextrose equivalent of 22.6 and a moisture content of 3.8%.

d. The thermal inhibition of Example 1a was repeated with the exception that the starch was held at 160° C. for 135 minutes instead of 145 minutes. 20.0 kg of the thermally inhibited starch at a moisture content of 10.2% were slurried in 40 L of water and the pH was adjusted to 4.5 with dilute hydrochloric acid. 60 g (0.30% w/w) of glucoamylase (AMG 300 L) were added. The slurry was placed in a 55° C. water bath and allowed to react with constant stirring until the net sugar concentration as measured using a refractometer reached 8.9%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 21.5 and a moisture content of 4.6%.

e. The thermal inhibition of Example 1a is repeated. After thermal inhibition, 4 kg of the thermally inhibited starch are slurried in 10 L of water and the pH is adjusted to 5.0 with dilute hydrochloric acid. 40 g of maltogenase 4000 L (commercially available from Novo Nordisk) are added. The slurry is placed in a 60° C. water bath and allowed to react with continuous stirring until net sugar concentration as measured using a refractometer reaches 11.5%. The pH is adjusted to 9.0 using 4% sodium hydroxide. The slurry is maintained at this pH and temperature for 30 minutes to deactivate the enzyme. The pH is then adjusted to 6.5 using dilute hydrochloric acid and spray dried as in Example 1b. The resultant starch has a DE of 20.6 and a moisture content of 4.9%.

f. The thermal inhibition of Example 1a was repeated with the exceptions that tapioca starch was used instead of waxy corn starch and the starch was held at 160° C. for 105 minutes instead of 145 minutes. 20.0 kg of the thermally inhibited starch were slurried in 40 L of water and the pH was adjusted to 4.5 with dilute hydrochloric acid. 80 g (0.40% w/w) of glucoamylase (AMG 300 L) were added. The slurry was placed in a 55° C. water bath and allowed to react with constant stirring until the net sugar concentration as measured using a refractometer reached 6.9%. The pH was adjusted to 9.5 using 4% sodium hydroxide. The slurry was maintained at this pH and temperature for half an hour to deactivate the enzyme. The pH was then adjusted to 6.5 using dilute hydrochloric acid and the slurry was spray dried using the procedure of Example 1b. The resultant starch had a dextrose equivalent of 18.7 and a moisture content of 4.0%.

g. The thermal inhibition of Example 1a was repeated with the exception that the starch was held at 160° C. for 135 minutes instead of 145 minutes. 5.0 k g of the thermally inhibited starch at a moisture content of 10.2% were slurried in 10 L of water and the pH was adjusted to 4.5 with dilute hydrochloric acid. 5 g (0.10% w/w) of glucoamylase (AMG 300 L) were added. The slurry was placed in a 50° C. water bath and allowed to react with constant stirring until the net sugar concentration as measured using a refractometer reached 2.1%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 5.0 and a moisture content of 4.4%.

h. The thermal inhibition of Example 1a was repeated with the exception that the starch was held at 160° C. for 135 minutes instead of 145 minutes. 5.0 kg of the thermally inhibited starch at a moisture content of 10.2% were slurried in 10 L of water and the pH was adjusted to 4.5 with dilute hydrochloric acid. 20 g (0.40% w/w) of glucoamylase (AMG 300 L) were added. The slurry was placed in a 53° C. water bath and allowed to react with constant stirring overnight. The pH was adjusted to 9.5 using 4% sodium hydroxide and the slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 43.0 and a moisture content of 4.3%.

i. The thermal inhibition of Example 1a was repeated with the exception that the base material used was corn starch instead of waxy corn starch and the starch was held at 160° C. for 120 minutes instead of 145 minutes. 8 kg of the thermally inhibited starch were slurried in 24 kg of water and the pH was adjusted to 4.0 with dilute hydrochloric acid. 32 g (0.4% w/w) of glucoamylase (G-Zyme G990SP, commercially available from Enzyme Biosystem) were added. The slurry was placed in a 55° C. water bath and allowed to react with constant stirring until the net sugar concentration as measured using a refractometer reached 6.9%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 20.8 and a moisture content of 3.6%.

j. The thermal inhibition of Example 1a was repeated with the exception that the starch was held at 160° C. for 135 minutes instead of 145 minutes. 5.0 kg of the thermally inhibited starch at a moisture content of 10.2% were slurried in 10 L of water and the pH was adjusted to 4.5 with dilute hydrochloric acid. 20 g (0.40% w/w) of glucoamylase (AMG 300 L) were added. The slurry was placed in a 53° C. water bath and allowed to react with constant stirring until the net sugar concentration indicated a DE of 24.5. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 24.5.

k. The thermal inhibition of Example 1a was repeated. After thermal inhibition, 4 kg of the thermally inhibited starch were slurried in 10 L of water and the pH was adjusted to 5.0 with dilute hydrochloric acid. 40 g of maltogenase 4000 L (commercially available from Novo Nordisk) were added. The slurry was placed in a 60° C. water bath and allowed to react with continuous stirring until the net sugar concentration indicated a DE of 21.3. The pH was adjusted to 9.0 using 4% sodium hydroxide. The slurry was maintained at this pH and temperature for 30 minutes to deactivate the enzyme. The pH was then adjusted to 6.5 using dilute hydrochloric acid and spray dried as in Example 1b. The resultant starch had a DE of 21.3.

l. The thermal inhibition of Example 1a was repeated with the exception that the starch was held at 160° C. for 100 minutes instead of 145 minutes. 9.0 kg of the thermally inhibited starch at a moisture content of 12.6% were slurried in 18 L water and the pH was adjusted to 4.0 with dilute hydrochloric acid. 27.0 g of glucoamylase (AMG 300 L) were added. The slurry was placed in a 57° C. water bath and allowed to react with constant stirring until the net sugar concentration as measured using a refractometer reached 8.4%. The pH was adjusted to 9.5 using 4% sodium hydroxide. The slurry was maintained at this pH and temperature for half an hour to deactivate the enzyme. The pH was then adjusted to 6.5 using a 25% solution of hydrochloric acid and the slurry was spray dried using the procedure of Example 1b. The resultant starch had a dextrose equivalent of 22.2 and a moisture content of 3.6%.

Example 3

Preparation of Tomato-Based Sauce (Hot Break)

| Ingredient | Control (wt %) | Experimental (wt %) |
| --- | --- | --- |
| Water | 44.85 | 44.85 |
| Tomato Paste (hot break) | 25.00 | 25.00 |
| Sugar | 15.00 | 12.00 |
| Vinegar | 12.00 | 12.00 |
| Salt | 2.90 | 2.90 |

-continued

| Ingredient | Control (wt %) | Experimental (wt %) |
|---|---|---|
| Onion Salt | 0.10 | 0.10 |
| Celery Salt | 0.10 | 0.10 |
| White Pepper | 0.05 | 0.05 |
| Starch Sample | 0.00 | 3.00 |

The following samples were used:
Sample 1=Corn Syrup Solid, 24 DE (FRODEX 24, commercially available from American Maize)
Sample 2=Starch of Example 2d
Sample 3=Maltodextrin, 5 DE (LODEX 5, commercially available from American Maize)
Sample 4=Starch of Example 2h
Sample 5=Starch of Example 2f
Sample 6=Starch of Example 2g
Sample 7=Starch of Example 2b
Sample 8=Starch of Example 2c
Sample 9=Corn Syrup Solid, 42 DE (STAR DRI 42R, commercially available from Staley)

The water, tomato paste and vinegar were mixed and placed in a Koruma double jacketed steam kettle. The remaining ingredients were dry blended and added to the Koruma. The mixture was heated to 90° C. and held for 5 minutes. The hot mixture was homogenized using a two stage Homogenizer at 150 Bar. The hot mixture was then stirred down in a Hobart blender using speed 2 for 1 minute and the paddle for mixing. The hot mixture was used to fill jars and refrigerated at 4° C. for storage. The sauces were evaluated organoleptically and for syneresis after 37 days storage with the following results:

Control—showed pulpiness and severe syneresis.
Sample 1—no significant difference from control.
Sample 2—more mouthfeel than control; no visible syneresis; thicker, shorter texture, and slightly smoother in appearance than the control. (Note: mouthfeel, as used herein, refers to a coated feeling on the tongue, heaviness, and a feeling of a film on the pallet).
Sample 3—very thin, non-viscous; texture similar to control; definite syneresis present.
Sample 4—slightly thicker and more viscous than control; highly pulpy texture.
Sample 5—very thick; pulpiness similar to control; light color; no syneresis.
Sample 6—moderately thick; very smooth and slightly long in texture; moderately pulpy.
Sample 7—no syneresis; slightly more cohesive but less thick than Sample 2.
Sample 8—no syneresis.
Sample 9—slightly thicker than control; extremely pulpy; syneresis visible.

Samples 1 and 7 showed the greatest degree of pulpiness.
The control and Samples 3 and 9 were the only ones that exhibited syneresis.

The viscosity and consistency of each sample was measured using a Bostwick Consistometer and the standard methodology described in 21 CFR § 155.194(b).

The temperature of the sample was adjusted to 20±1° C. as was the Bostwick trough. The end-to-end level of the Bostwick was adjusted by means of the spirit level placed in the trough of the instrument. The side-to-side level was adjusted by means of the built-in spirit level. The sample was then transferred to the dry sample chamber of the Bostwick, filling the chamber slightly more than level full and avoiding air bubbles. A straight edge is passed across the top of the chamber starting from the gate end to remove excess sample. The gate is released by gradual pressure on the lever, holding the instrument down at the same time to prevent movement as the gate is released. After 30 seconds, the maximum distance of flow was read. The results are listed in Table I below.

TABLE I

| | Bostwick @ 20° C. (cm) | | Bostwick @ 5° C. (cm) | |
|---|---|---|---|---|
| Sample | 24 hours | 1 week | 24 hours | 1 week |
| Control | 4.5 | 3.6 | 3.6 | 3.4 |
| Sample 1 | 3.9 | 4.3 | 3.7 | 3.8 |
| Sample 2 | 3.7 | 3.6 | 3.1 | 2.9 |
| Sample 3 | 4.1 | — | 4.0 | 3.7 |
| Sample 4 | 3.5 | 3.9 | 3.6 | 3.8 |
| Sample 5 | 3.4 | 3.6 | 3.3 | 3.0 |
| Sample 6 | 3.0 | 3.4 | 3.3 | 3.3 |
| Sample 7 | 3.4 | 3.3 | 3.0 | 3.0 |
| Sample 8 | 3.2 | 3.4 | 2.9 | 3.1 |
| Sample 9 | — | — | — | — |

As can be seen from Table I, the starches of the instant invention have a higher viscosity (lower Bostwick) than standards known in the art of comparable dextrose equivalents.

Serum separation of the samples, after being stored for 37 days, was measured by pouring off any serum and weighing the serum. The results are given below in Table II.

TABLE II

| Sample | Weight of Serum (g) | % Reduction |
|---|---|---|
| Control | 1.220 | — |
| 7 | 0 | 100 |
| 2 | 0.088 | 92.77 |
| 6 | 0.131 | 89.26 |
| 8 | 0.192 | 84.26 |
| 4 | 0.230 | 81.15 |
| 5 | 0.338 | 72.30 |
| 9 | 0.360 | 70.49 |
| 1 | 0.454 | 62.79 |

Example 4

Preparation of Tomato-Based Sauce (Cold Break)

| Ingredient | Control 1 (wt %) | Control 2 (wt. %) | Expt. (wt. %) |
|---|---|---|---|
| Water | 39.94 | 39.94 | 39.94 |
| Sugar | 15.00 | 15.00 | 11.20 |
| Hot Break Tomato | 30.00 | 0.00 | 0.00 |
| Cold Break Tomato | 0.00 | 30.00 | 30.00 |
| Starch | 0.00 | 0.00 | 3.80 |
| Vinegar 5% | 12.00 | 12.00 | 12.00 |
| Salt | 2.80 | 2.80 | 2.80 |
| Potassium Sorbate | 0.01 | 0.01 | 0.01 |
| Onion Salt | 0.10 | 0.10 | 0.10 |
| Celery Salt | 0.10 | 0.10 | 0.10 |
| Pepper | 0.05 | 0.05 | 0.05 |

Sample Starches
Expt. 1=Starch of Example 2f
Expt. 2=Starch of Example 2b

The water, tomato paste, and vinegar were blended in a double jacketed steam kettle. The remaining ingredients were added and the mixture was heated to 90° C. The mixture was held at this temperature for five minutes and homogenized. Control 1 was homogenized at 200 bar and the remaining samples were "homogenized" without any pressure. The homogenized mixture was stirred down using a Hobart mixer equipped with a paddle at speed 2 for one minute. The mixture was jarred and refrigerated at 4° C.

After 72 hours, the samples were checked and the following results were observed:
Control 1—thick; severe serum separation
Control 2—very thin and liquid; slight serum separation
Expt. 1—heavy texture; no serum separation
Expt. 2—flowable texture; no gelling; no serum separation Bostwick consistency was measured at various times and the results are shown in Table III.

TABLE III

| Sample | @72 hrs, 5° C. (cm) | @7 days, 5° C. (cm) | @7 days, 20° C. (cm) |
|---|---|---|---|
| Control 1 | 3.0 | 4.5 | 5.0 |
| Control 2 | 9.0 | 8.5 | 9.0 |
| Expt. 1 | 7.0 | 6.5 | 7.5 |
| Expt. 2 | 5.0 | 4.5 | 5.0 |

The present starches eliminate syneresis and provide a viscosity between that of hot and cold break controls. The viscosity of either control may be more closely matched by varying the amount of starch added.

Example 5

Preparation of Tomato-Based Sauce

| Ingredient | Control 1 (wt %) | Expt. (wt. %) |
|---|---|---|
| Water | 44.85 | 44.85 |
| Sugar | 15.00 | 13.00 |
| Hot Break Tomato | 25.00 | 25.00 |
| Vinegar | 12.00 | 12.00 |
| Salt | 2.90 | 2.90 |
| Onion Salt | 0.10 | 0.10 |
| Celery Salt | 0.10 | 0.10 |
| White Pepper | 0.05 | 0.05 |
| Sample Starch | 0.00 | 2.00 |

Sample Starches
Expt. 1=Native Sago Starch (Note: 3.00 wt. % was used of this starch and 21.00 wt % sugar)
Expt. 2=Starch of Example 2i
Expt. 3=Starch of Example 2d
Expt. 4=24 DE Corn Syrup Solids The water, tomato paste, and vinegar were blended in a double jacketed steam kettle. The remaining ingredients were added and the mixture was heated to 90° C. The Mixture was held at this temperature for five minutes and homogenized at 200 bar. The homogenized mixture was stirred down using a Hobart mixer equipped with a paddle at speed 2 for one minute. The mixture was jarred and refrigerated at 4° C.

After 72 hours, the samples were checked and the results are shown in Table IV.

TABLE IV

| Sample | Serum (g) |
|---|---|
| Control | 1.22 |
| Expt. 1 | 0.26 |
| Expt. 2 | 0.24 |
| Expt. 3 | 0.45 |
| Expt. 4 | 0.454 |

The present starches significantly reduce syneresis and provide a viscosity between that of hot and cold break controls.

The viscosity of either control may be more closely matched by varying the amount of starch added.

Example 6

Preparation of Tomato Sauce a.

| Ingredient | Control 1 (wt %) |
|---|---|
| Water | 63.52 |
| Tomato Paste | 30.00 |
| Olive Oil | 2.00 |
| Salt | 1.06 |
| Onion Powder | 0.19 |
| Sweet Basil | 0.09 |
| White Pepper | 0.08 |
| Oregano | 0.04 |
| Garlic Powder | 0.02 |
| 10 DE maltodextrin | 3.00 |

The water, tomato paste and olive oil were blended. The remaining ingredients were dry blended and added to the tomato mixture. The mixture was heated to 88° C. (190° F.) and held at that temperature for 10 minutes. The resultant tomato sauce was hot filled into jars and refrigerated at 4° C. overnight. The sauce was then heated to 74° C. (165° F.) and Bostwick viscosity was measured for each sample at 15, 30, 45 and 60 seconds using the procedure previously described. The average of three readings are listed in Table V below.

b. Example 6a was repeated except the mixture was heated to 90.6° C. (195° F.) instead of to 88° C. (190° F.) with no subsequent hold. The following formulations were used with the amount of each ingredient is listed as a weight percent.

| Ingredient | Control 2 | Expt |
|---|---|---|
| Water | 65.02 | 63.52 |
| Tomato Paste | 30.00 | 30.00 |
| Olive Oil | 2.00 | 2.00 |
| Salt | 1.06 | 1.06 |
| Onion Powder | 0.19 | 0.19 |
| Sweet Basil | 0.09 | 0.09 |
| White Pepper | 0.08 | 0.08 |
| Oregano | 0.04 | 0.04 |
| Garlic Powder | 0.02 | 0.02 |
| 10 DE Maltodextrin | 1.50 | 0.00 |
| Starch of Ex. 2d | 0.00 | 3.00 |

Bostwick viscosity was measured for each sample at 15, 30, 45 and 60 seconds. The average of three readings are listed in Table V below.

TABLE V

| Time(s) | Control 1 | Control 2 | Expt. |
|---|---|---|---|
| 15 | 11.25 | 12.5 | 7.25 |
| 30 | 11.33 | 12.75 | 8.12 |
| 45 | 11.33 | 13.00 | 8.50 |
| 60 | 11.33 | 13.25 | 8.75 |

Example 7

Preparation of Fruit Jelly

| Ingredients | Control (wt. %) | Expt. 1 | Expt. 2 |
| --- | --- | --- | --- |
| Frozen Fruit | 45.00 | 45.00 | 45.00 |
| Water | 55.60 | 53.20 | 54.40 |
| Sugar | 5.00 | 5.00 | 5.00 |
| Starch of Example 21 | 0.00 | 3.00 | 1.50 |
| Pectin (AF 401) | 0.60 | 0.00 | 0.30 |
| Sodium Citrate | 0.10 | 0.10 | 0.10 |

The sugar, starch, pectin and sodium citrate were mixed. The fruit and water mixture was added. The mixture was then heated to 90° C. (195° F.) and held for ten minutes. The solids content was reduced to approximately 62° Brix, removing 6.30 weight percent water, and the pH was adjusted to 3.0 using citric acid. The jellies were cooled to room temperature. The jellies were then evaluated using pH, Bostwick consistency and degree Brix. The results are listed in Table VI below.

TABLE VI

| Sample | pH | 30 sec Bostwick (cm) | 60 sec Bostwick (cm) | Brix |
| --- | --- | --- | --- | --- |
| Control | 3.07 | 4.0 | 4.5 | 59.4 |
| Expt. 1 | 3.03 | 4.5 | 5.0 | 61.4 |
| Expt. 2 | 3.04 | 4.5 | 5.0 | 62.8 |

As can be seen from Table VI, pectin can be either partially or fully replaced by the starches of the present invention.

Further, sensory evaluation showed that the jellies made with the instant starches exhibited increased gloss, no serum separation and good clarity.

Example 8

Preparation of Strawberry Fruit Preparation

| Ingredients | Amount (wt. %) |
| --- | --- |
| Frozen Strawberries | 35.00 |
| Sugar | 53.00 |
| Water | 8.40 |
| Experimental Starch | 3.30 |
| Pectin | 0.30 |

Samples
24 DE corn syrup solids
Starch of Example 2a

The fruit, sugar, pectin, and water were heated to 170° F. (77° C.). The pectin solution was next added and the mixture was heated to 200° F. (93° C.) while constantly stirring. When Brix reached about 58°, the mixture was removed from heat and sufficient citric acid solution (50%) was added to adjust the pH to 3.8. The mixture was then cooled to 160° F. (71° C.) and filled into jars. After 24 hours, Brix, Bostwick and pH were measured using standard procedures known in the art. The results are in Table VII below.

TABLE VII

| Starch | pH | Brix | 15 sec Bostwick (cm) | 30 sec Bostwick (cm) |
| --- | --- | --- | --- | --- |
| 24 DE CSS | 3.37 | 58.2 | 9 | 10½ |
| Starch of Ex. 2a | 3.34 | 57.8 | 5¾ | 7 |

As can be seen from Table VII, the starch of the instant invention provides a higher viscosity (lower Bostwick) than a corn syrup solid of comparable dextrose equivalent.

Example 9

Comparison of Thermally-Inhibited, Enzymatically-Treated Starch and Enzymatically-Treated, Thermally-Inhibited Starch a. A 30% solids by weight waxy corn starch slurry was prepared and its pH was adjusted to 9.6 using sodium carbonate. The pH adjusted starch was filtered using a basket decanter (commercially available from Reinveld) and dried using a flash drier to a moisture content of 13%. The starch was then dehydrated in a fluidized bed reactor to a moisture content of less than 1% at a temperature of 130° C. The dehydrated starch was then heated to 160° C. and held at this temperature for 100 minutes. The starch was then cooled to 65° C. within the reactor by supplying cooling water to the jacket and introducing cold air. The thermally inhibited starch was then reslurried to 25% solids by weight and washed. The balance of the slurry was adjusted to 14% and the pH was adjusted to 5.2 using hydrochloric acid. The slurry was washed using a disk centrifuge (commercially available from Merco), filtered using a basket decanter, and dried to 11% moisture content using a flask drier.

1.0 kg of the thermally inhibited starch at a moisture content of 10.5% was slurried in 3 L of water and the pH was adjusted to 4.5 with dilute hydrochloric acid. 5 g of glucoamylase (AMG 300 L commercially available from Novo Nordisk) was added. The slurry was placed in a 55° C. water bath and allowed to react with constant stirring until a DE of about 23 was reached. The pH was adjusted to 9.5 using sodium hydroxide. The slurry was maintained at this pH and temperature for half an hour to deactivate the enzyme. The pH was then adjusted to 6.5 using dilute hydrochloric acid.

The slurry was spray dried using the following conditions:

| | |
| --- | --- |
| inlet temperature | 225° C. |
| outlet temperature | 100° C. |
| % solids | 20% |
| speed | 30–35 rpm |

The resultant spray dried starch was a thermally inhibited, subsequently enzyme converted starch.

b. 1.0 kg of waxy corn starch was slurried in 3 L of water and the pH was adjusted to 4.5 with dilute hydrochloric acid. 5 g of glucoamylase (AMG 300 L commercially available from Novo Nordisk) was added. The slurry was placed in a 55° C. water bath and allowed to react with constant stirring until a DE of about 23 was reached. The pH was adjusted to 9.5 using sodium hydroxide. The slurry was maintained at this pH and temperature for half an hour to deactivate the enzyme. The pH was then adjusted to 6.5 using dilute hydrochloric acid.

The pH was adjusted to 9.6 using sodium carbonate. The pH adjusted, enzymatically converted starch was filtered using a basket decanter (commercially available from Reinveld) and dried using a flash drier to a moisture content of 13%. The enzyme converted starch was then further dehydrated in a fluidized bed reactor to a moisture content of less than 1% at a temperature of 130° C. The starch was then heated to 160° C. and held at this temperature for 100 minutes. The starch was then cooled to 65° C. within the reactor by supplying cooling water to the jacket and introducing cold air. The starch was then reslurried to 25% solids by weight and washed. The balance of the slurry was adjusted to 14% and the pH was adjusted to 5.2 using hydrochloric acid. The slurry was washed using a disk centrifuge (commercially available from Merco), filtered using a basket decanter, and dried to 11% moisture content using a flask drier. The resultant starch was an enzyme converted, subsequently thermally inhibited starch.

c. 1.0 kg of waxy corn starch was slurried in 3 L of water and the pH was adjusted to 4.5 with dilute hydrochloric acid. 5 g of glucoamylase (AMG300L commercially available from Novo Nordisk) was added. The slurry was placed in a 55° C. water bath and allowed to react with constant stirring until a DE of about 23 was reached. The pH was adjusted to 9.5 using sodium hydroxide. The slurry was maintained at this pH and temperature for half an hour to deactivate the enzyme. The pH was then adjusted to 6.5 using dilute hydrochloric acid.

The pH was adjusted to 9.6 using sodium carbonate. The pH adjusted starch was filtered using a basket decanter (commercially available from Reinveld) and dehydrated using a flash drier to a moisture content of 13%. The dehydrated starch was then further dried in a fluidized bed reactor to a moisture content of less than 1% at a temperature of 130° C. The starch was then heated to 160° C. and held at this temperature for 160 minutes. The starch was then cooled to 65° C. within the reactor by supplying cooling water to the jacket and introducing cold air. The starch was then reslurried to 25% solids by weight and washed. The balance of the slurry was adjusted to 14% and the pH was adjusted to 5.2 using hydrochloric acid. The slurry was washed using a disk centrifuge (commercially available from Merco), filtered using a basket decanter, and dried to 11% moisture content using a flask drier. The resultant starch was an enzyme converted, subsequently thermally inhibited starch.

Ketchup formulations were prepared using the above starches and the following formulation:

| Ingredient | Amount (g) |
|---|---|
| Ketchup | 147 |
| Starch | 3 |

The ingredients were mixed together and heated to 195° F. The ketchups were allowed to cool to room temperature overnight.

Five panelists tasted the ketchups. All five agreed that the ketchup made with the starch of Example 9c had the worst color, very dark, brown; and the worst flavor, brown, caramelized, burnt, sour, and musty. Five panelists agreed the ketchup made with the starch of Example 9b was too dark and three of the five also thought it had an off-note taste, described as brown and sour. All five thought the ketchup made with the starch of Example 9a, which was thermally inhibited prior to enzyme conversion, had the best color and four thought it had the best flavor, closest to that of pure ketchup.

Example 10

Viscosity of Thermally-inhibited, Enzyme-converted Starches a. Hot Paste Viscosity Measurement A slurry containing 5.0% starch on a dry weight basis was prepared and heated from 50° C. to 94° C. at a rate of 1.5° C. per minute. The slurry was then held at 94° C. for 10 minutes. Hot viscosity was measured while heating the paste in an RVA Series 4 Rapid Visco Analyzer (Newport Scientific, New South Wales, Australia).

b. Cold Paste Viscosity Measurement

The cooked paste from the hot paste viscosity measurement was cooled to 22° C. and held for 30 minutes. Using an RFS2-BD050 rheometer (Rheometrics, Piscataway, N.J.), viscosity was measured during a shear sweep from 0.1 to 100 $sec^{-1}$ at 22° C. Parallel plates of 25 mm diameter were used at a distance of 1.25% mm apart. Viscosity was compared at a shear of 10 $sec^{-1}$.

The hot and cold viscosity measurements are shown in Table VIII below.

TABLE VIII

| Starch | Hot Peak (cps) | Cold Peak (cps) |
|---|---|---|
| EX 2b | 190 | 435 |
| EX 2d | 197 | 351 |
| EX 2c | 146 | 303 |
| EX 2f | 75 | 263 |
| EX 2l | 234 | 388 |

Example 11

Preparation of Jam

| Ingredient | Control (wt %) | Experimental (wt %) |
|---|---|---|
| Frozen Strawberries | 45.00 | 45.00 |
| Pectin (AF 401) | 0.6 | 0.0 |
| Sugar | 53.20 | 56.0 |
| Water | 5.00 | 5.00 |
| Water removed | 6.20 | 6.20 |
| Starch | 0.0 | 3.00 |

Samples
1=Starch of Example 2k
2=Starch of Example 2j

The pectin, 70% of the sugar, and the starch were mixed. The fruit and water were mixed separately and added to the dry ingredient mixture. The remaining sugar was added and the jam mixture was heated to 195° F. (90.6° C.) and held while stirring constantly. When Brix reached about 62°, the mixture was removed from heat and sufficient citric acid (50% solution) was added to adjust the pH to 3.0. The mixture was cooled to room temperature and filled into jars. The jars were stored at 4° C. for 24 days.

a. Sensory Evaluation

The control gave a short texture, high mouthfeel, and melted quickly.

Sample 1 increased in gel strength over the 24 day storage period. The texture was very similar to the control, as was the sheer and transparency. However, Sample 1 syneresed less than the control.

Sample 2 had an acceptable gel structure and mouthfeel and was not cohesive. It gave more film building than the control and had the same sheen and transparency as the control. Sample 2 syneresed less than the control.

b. Texture Analysis

The texture of the jams were measured using a Texture Analyzer TAXT2 (Stable Micro Systems). A 25 mm, 20° conical probe

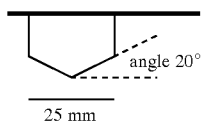

was used to determine the force needed to penetrate 20 mm using the following parameters:
speed to surface: 5 mm/sec
initial force: 10 g force
speed into sample: 0.8 mm/sec
depth: 20 mm
speed upwards: 0.8 mm/sec The results are listed below in Table IX.

TABLE IX

| Day | Sample 1 Peak Force (g) | Sample 2 Peak Force (g) | Control Peak Force (g) |
|---|---|---|---|
| 1 | 49.028 | 34.726 | |
| 6 | 60.404 | 40.707 | |
| 8 | 61.579 | 37.022 | |
| 10 | 67.836 | 40.682 | 160.853 |
| 17 | 66.776 | 39.583 | 171.115 |
| 24 | 63.742 | 43.437 | |

Both Samples 1 and 2 gelled, gave a cuttable texture and a shiny, transparent appearance. The thermally inhibited, enzyme converted starch samples controlled serum separation and gave a short texture. Neither sample had any off-flavors.

We claim:

1. A thermally-inhibited, enzymatically-hydrolyzed, ungelatinized granular starch or flour, wherein the granula starch or flour was substantially anhydrous and heated to a temperature which thermally inhibited the starch or flour prior to enzymatic hydrolysis.

2. The starch or flour of claim 1, wherein the enzymatic hydrolysis is accomplished using an enzyme selected from the group consisting of α-amylase, glucoamylase, and maltogenase.

3. The starch or flour of claim 1, wherein the starch or flour has a dextrose equivalent of from about 5 to about 60.

4. The starch or flour of claim 3, wherein the starch or flour has a dextrose equivalent of from about 20 to about 30.

5. The starch or flour of claim 1, wherein the thermal inhibition is conducted by dehydrating the starch or flour to at least substantially anhydrous and subsequently heating the at least substantially anhydrous starch or flour for a time and at a temperature sufficient to inhibit the starch.

6. The starch or flour of claim 5, wherein the enzymatic hydrolysis is accomplished using an enzyme selected from the group consisting of α-amylase, glucoamylase, and maltogenase.

7. The starch or flour of claim 5, wherein the starch or flour has a dextrose equivalent of from about 5 to about 60.

8. The starch or flour of claim 5, wherein the starch or flour has a dextrose equivalent of from about 20 to about 30.

9. A process for making the starch or flour of claim 1 which comprises:

a. dehydrating the starch or flour to at least substantially anhydrous;

b. thermally inhibiting the starch or flour at a temperature and for a time sufficient to inhibit the starch or flour;

c. slurrying the starch or flour in an aqueous medium at from about 10 to about 40% solids;

d. hydrolyzing the starch or flour to a dextrose equivalent of from about 5 to about 60 using an enzyme capable of hydrolyzing a granular starch or flour; and e. inactivating the enzyme.

10. The process of claim 9, further comprising recovering the starch or flour by drying.

11. The process of claim 10, wherein drying is accomplished by a method selected from the group consisting of drum drying, freeze drying, and spray drying.

12. The process of claim 9, wherein the dehydrating step is a thermal dehydrating step carried out in a fluidized bed.

13. The process of claim 9, wherein the dehydrating step is a non-thermal dehydrating step carried out by freeze drying the starch or flour or by extracting the starch or flour with a solvent.

14. The process of claim 9, wherein the heat treating step is carried out at a temperature of at least 100° C.

15. The process of claim 14, wherein the heat treating step is carried out at a temperature of about 120° C. to about 180° C. for up to about 20 hours.

16. The process of claim 9, wherein the enzyme is selected from the group consisting of α-amylase, glucoamylase, and maltogenase.

17. The process of claim 9, wherein the starch or flour is hydrolyzed to a dextrose equivalent of from about 20 to about 30.

* * * * *